United States Patent
Yang

(10) Patent No.: US 7,889,643 B2
(45) Date of Patent: Feb. 15, 2011

(54) METHOD OF PROVIDING MULTIMEDIA SERVICE OF MOBILE COMMUNICATION TERMINAL AND MOBILE COMMUNICATION TERMINAL FOR PERFORMING THE SAME

(75) Inventor: Sung Zoon Yang, Incheon (KR)

(73) Assignee: LG Electronics Inc., Seoul (KR)

( * ) Notice: Subject to any disclaimer, the term of this patent is extended or adjusted under 35 U.S.C. 154(b) by 711 days.

(21) Appl. No.: 11/862,077

(22) Filed: Sep. 26, 2007

(65) Prior Publication Data

US 2008/0076473 A1 Mar. 27, 2008

(30) Foreign Application Priority Data

Sep. 26, 2006 (KR) .................... 10-2006-0093406

(51) Int. Cl.
*H04L 12/24* (2006.01)
*G06F 15/16* (2006.01)

(52) U.S. Cl. .................. 370/229; 370/428; 709/231

(58) Field of Classification Search ........ None
See application file for complete search history.

(56) References Cited

U.S. PATENT DOCUMENTS

| 2003/0225797 | A1* | 12/2003 | Shields et al. ........ 707/202 |
| 2004/0059826 | A1* | 3/2004 | Gould et al. .......... 709/231 |
| 2004/0184461 | A1* | 9/2004 | Forssell et al. ....... 370/395.2 |
| 2004/0189809 | A1* | 9/2004 | Choi ................ 348/207.1 |
| 2004/0264471 | A1* | 12/2004 | Boulay et al. ........ 370/395.2 |
| 2005/0106937 | A1* | 5/2005 | Lin .................. 439/567 |
| 2005/0195695 | A1* | 9/2005 | Yanase et al. ....... 369/30.06 |
| 2006/0253568 | A1* | 11/2006 | Lin .................. 709/224 |

FOREIGN PATENT DOCUMENTS

| EP | 1677474 A1 | 7/2006 |
| KR | 10-2005-0058807 B1 | 6/2005 |
| KR | 10-2006-0065104 A | 6/2006 |
| KR | 10-2006-0078471 A | 7/2006 |
| KR | 10-0610844 B1 | 8/2006 |

* cited by examiner

*Primary Examiner*—Chi H Pham
*Assistant Examiner*—Soon-Dong D Hyun
(74) *Attorney, Agent, or Firm*—Birch, Stewart, Kolasch & Birch, LLP

(57) ABSTRACT

A method of providing a multimedia service to a mobile communication terminal, which includes selecting a content to be downloaded, and selectively downloading the content using a streaming mode when the content cannot be downloaded using a progressive mode.

20 Claims, 7 Drawing Sheets

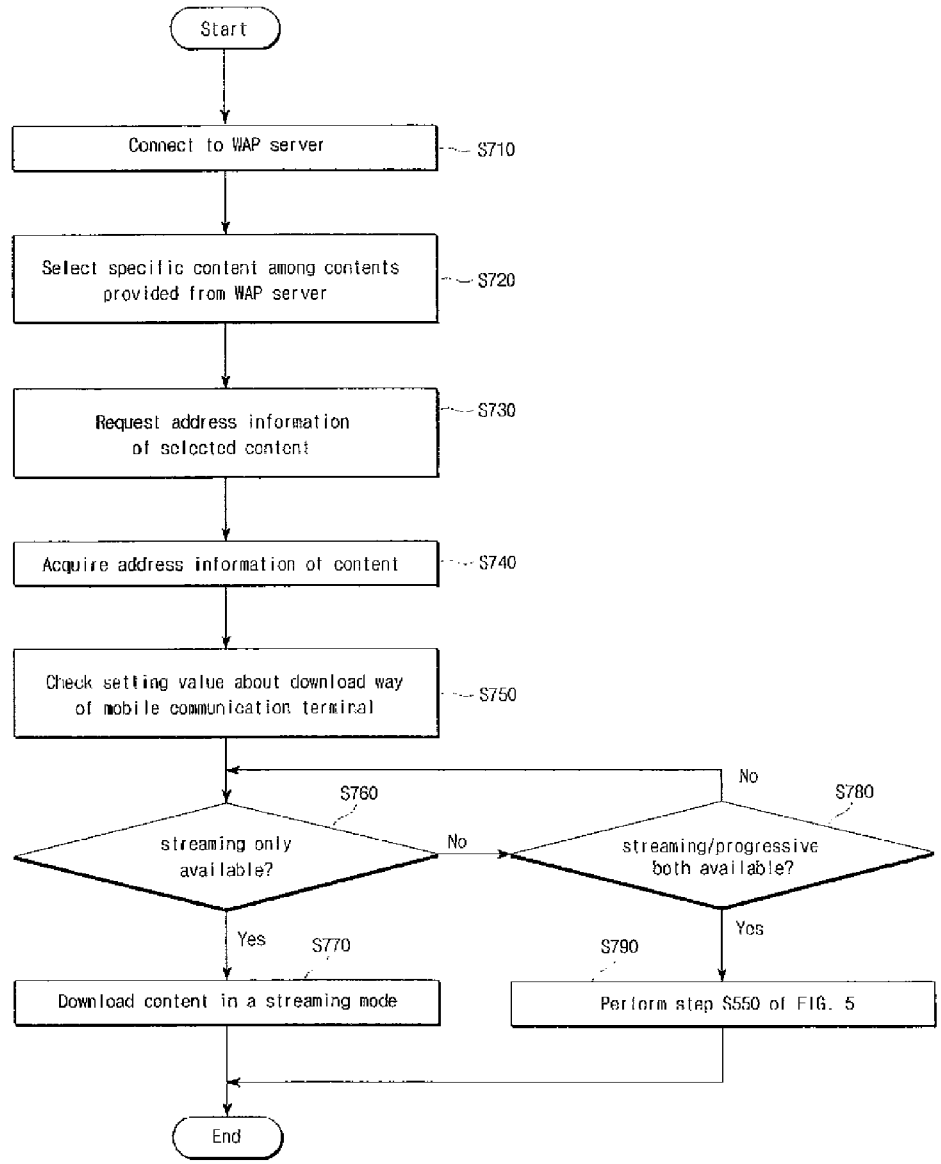

US 7,889,643 B2

METHOD OF PROVIDING MULTIMEDIA SERVICE OF MOBILE COMMUNICATION TERMINAL AND MOBILE COMMUNICATION TERMINAL FOR PERFORMING THE SAME

CROSS-REFERENCE TO RELATED APPLICATION

This non-provisional application claims priority under 35 U.S.C. §119(a) to Patent Application No. 10-2006-0093406 filed in the Republic of Korea on Sep. 26, 2006, the entire contents of which are hereby incorporated by reference in its entirety.

BACKGROUND OF THE INVENTION

1. Field of the Invention

The present invention relates to a mobile terminal and corresponding method that selectively provides a multimedia service in a streaming or progressive mode based on an amount of memory available in the mobile terminal.

2. Description of the Related Art

Mobile terminals now provide many additional functions besides the basic call service function. For example, users can access the Internet, watch videos or broadcasts, play games, send and receive text and voice messages, perform scheduling tasks, etc. using their mobile terminal.

In addition, because the mobile terminals provide many additional functions, the amount of memory used is also increased. However, the mobile terminal does not effectively control and inform the user about the available amount of memory in the mobile terminal.

SUMMARY OF THE INVENTION

Accordingly, one object of the present invention is to address the above-noted and other objects.

Another object of the present invention is to provide a mobile communication terminal and corresponding method that selectively provides a multimedia service in a streaming mode or a progressive mode.

To achieve these and other advantages and in accordance with the purpose of the present invention, as embodied and broadly described herein, the present invention provides in one aspect a method of providing a multimedia service to a mobile communication terminal. The method includes selecting a content to be downloaded, and selectively downloading the content using a streaming mode when the content cannot be downloaded using a progressive mode.

In another aspect, the present invention provides a mobile communication terminal including an input unit configured to select a content to be downloaded, a wireless transceiver configured to receive the content from a server, a memory configured to store the content, and a controller configured to selectively download the content using a streaming mode when the content cannot be downloaded using a progressive mode.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 7 is a flowchart illustrating a method of selectively providing a multimedia service to a mobile communication terminal according to still another embodiment of the present invention.

DETAILED DESCRIPTION OF THE INVENTION

Reference will now be made in detail to the preferred embodiments of the present invention, examples of which are illustrated in the accompanying drawings.

The mobile communication system according to the present invention selectively provides a multimedia service in a streaming mode or a progressive mode. That is, the mobile terminal selectively downloads a multimedia program (e.g., a movie, music video, etc.) using a progressive or streaming mode.

The progressive mode plays the multimedia content and also stores the multimedia content, and the streaming mode only displays the multimedia content and does not store the multimedia content. The mobile communication terminal also advantageously determines an amount of available memory on the terminal when deciding whether to download the content in a progressive or streaming mode.

Figure 1:
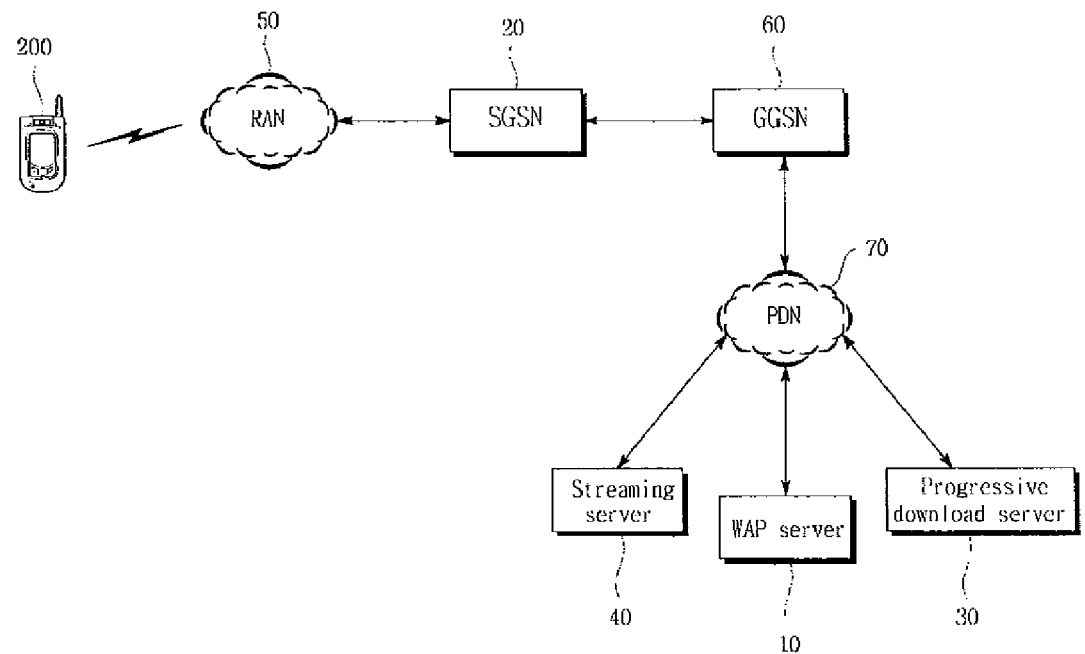
FIG. 1 is an overview illustrating a system for selectively providing a multimedia service to a mobile communication terminal according to an embodiment of the present invention.

In more detail, FIG. 1 is an overview illustrating a system for providing a multimedia service to a mobile communication terminal according to an embodiment of the present invention. As shown, the system includes a Wireless Application Protocol (WAP) server 10, a Serving General Packet Radio Service (GPRS) Support Node (SGSN) 20, a progressive download server 30, a streaming server 40, a Radio Access Network (RAN) 50, a Gateway GPRS Support Node (GGSN) 60, a Packet Data Network (PDN) 70, and a mobile communication terminal 200.

The RAN 50 includes a base station and a base station controller that controls the base station. Further, the SGSN 20 functions as a serving node of the GPRS, and manages a packet mode data service of the mobile communication terminal 200 by setting a mobility management context for a packet mode of the terminal 200. That is, the SGSN 20 performs functions such as the routing and transmission of a packet, mobility management, logical link management, and authentication and accounting.

Further, the GGSN 60 is positioned between the SGSN 20 and the external PDN 70 and performs a tunneling and IP routing function by maintaining routing information of the SGSN 20. In addition, the WAP server 10 communicates with the mobile terminal 200 using the WAP and stores various content information. In addition, when the mobile terminal 200 connects to the WAP server 10 and selects a specific content, the WAP server 10 provides the mobile terminal 200 with address information of the progressive download server 30 or the streaming server 40 in which the selected content is stored. That is, the progressive download server 30 and the streaming server 40 is connected to the PDN 70 to transmit a content to the mobile terminal 200 according to the selected download mode.

Figure 2:
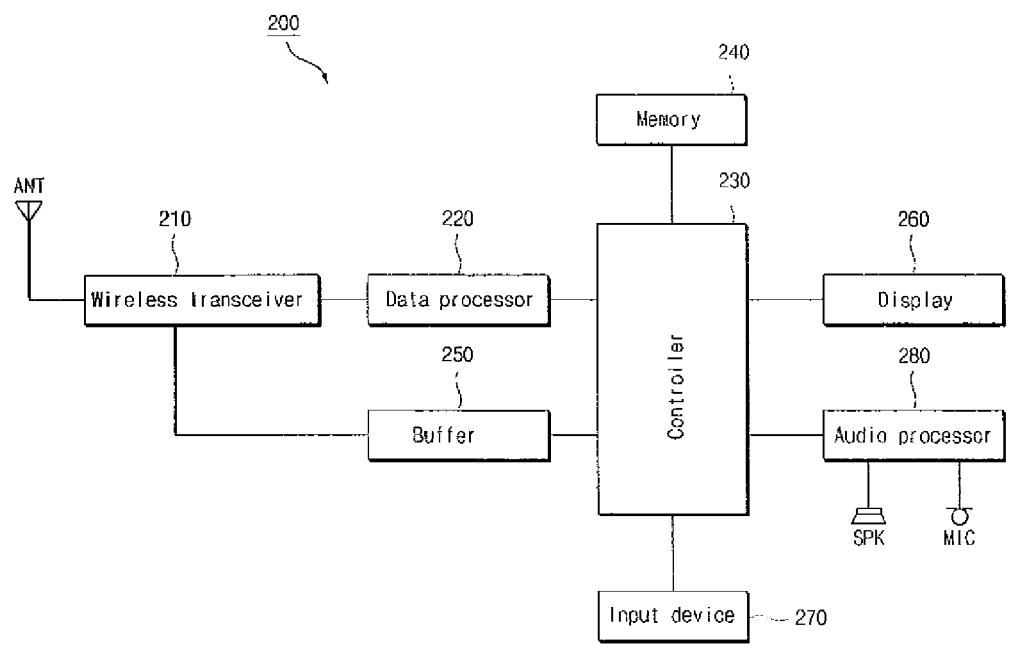
FIG. 2 is a block diagram illustrating a mobile communication terminal according to an embodiment of the present invention.

Next, FIG. 2 is a block diagram illustrating the mobile communication terminal 200 according to an embodiment of the present invention. As shown, the mobile terminal 200 includes a wireless transceiver 210, a data processor 220, a controller 230, a memory 240, a buffer 250, a display 260, an input unit 270 and an audio processor 280.

The wireless transceiver 210 performs a communication function of the mobile communication terminal 200. That is, the controller 230 controls the wireless transceiver 210 to connect the terminal 200 to the WAP server 10 and to receive address information of a specific content from the WAP server 10. Further, the controller 230 selectively connects the wireless transceiver 210 to the progressive download server 30 or the streaming server 40.

In addition, the data processor 220 encodes and modulates a signal to be transmitted via an antenna (ANT) and decodes and demodulates a signal received by the antenna (ANT). The controller 230 also controls the overall operations of the mobile terminal 200. The data processor 220 is shown in FIG. 2 as a separate component from the controller 230, but the data processor 220 may be included within the controller 230.

Further, the controller 230 also compares an amount of memory available in the memory 240 with the amount of a content to be downloaded. If the remaining capacity of the memory 240 is larger than the capacity of the content to be downloaded, the controller 230 downloads the content using a progressive mode. Alternatively, if the remaining capacity of the memory 240 is less than the capacity of the content to be downloaded, the controller 230 downloads the content using a streaming mode.

In another embodiment, the controller 230 downloads a specified content via a streaming mode or a progressive mode according to a value that is previously set in the mobile communication terminal. In more detail, the memory 240 stores a value indicating what type of download mode is preferred and the controller 230 refers to this preset value when downloading a selected content.

The memory 240 also includes a program memory and a data memory. That is, the program memory stores programs for operating the mobile terminal, and the data memory stores the value that is preset regarding the downloading operation as well as other data used by the terminal 200.

Further, during the downloading operation, the buffer 250 temporarily stores the content received from the streaming server 40 or the progressive download server 30 through the wireless transceiver 210. In addition, the display 260 outputs various display information and various menus for operating the terminal 200 and may include a Liquid Crystal Display (LCD) or an Organic Light Emitting Diode (OLED) display. The display 260 may also include two or more displays such as an external display and an internal display. The controller 230 also provides a pop-up window on the display 260 to notify the user that the memory capacity is insufficient when a user wants to download a particular content in the progressive mode and there is not enough memory space available.

In addition, the input unit 270 includes several different buttons and keys for inputting numeric and character information as well as function buttons for setting various functions. For example, the input unit 270 may include a keypad having a direction key, a jog dial, a joy stick, etc. The input unit 270 may also include a touch screen that the user touches to input information.

Further, the user uses the input unit 270 to search and select a particular content that he or she wants to download. The user may also use the input unit 270 to set a particular value to inform the controller 230 how a selected content is to be downloaded (e.g., in a progressive or streaming mode). In more detail, the set value represents information about whether the controller 230 should download the content in a streaming only mode or either one of a streaming or progressive mode.

Thus, by setting the value to a streaming mode only value, the user can advantageously prevent the controller 230 from downloading and storing any selected contents in the terminal 200. Further, the audio processor 280 outputs an audio signal that is decoded in the data processor 220 through a speaker (SPK) or outputs an audio signal generated from a microphone (MIC) to the data processor 220.

Figure 3:
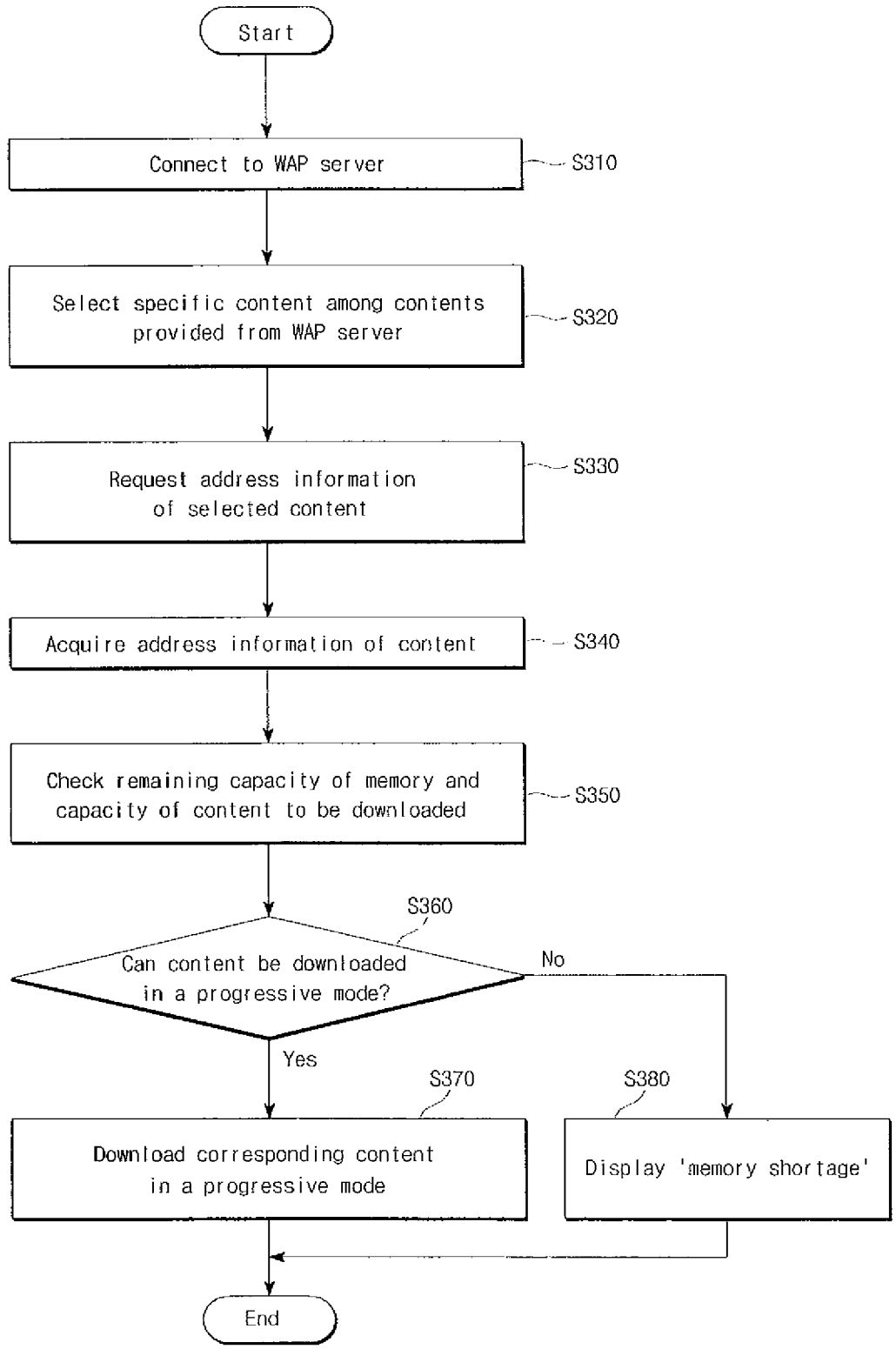
FIG. 3 is a flowchart illustrating a method of selectively providing a multimedia service to a mobile communication terminal according to an embodiment of the present invention.

Next, FIG. 3 is a flowchart illustrating a method of providing a multimedia service for a mobile communication terminal according to an embodiment of the present invention. FIGS. 1 and 2 will also be referred to in this description. As shown in FIG. 3, when the user requests connection to the WAP server 10 using the input unit 270 so as to download a specific content, the controller 230 controls the wireless transceiver 210 to connect to the WAP server 10 (S310).

Then, the user can search for and select a particular content among a plurality of different contents that he or she wants to download using the input unit 270 (S320). When the user selects the particular content to be downloaded, the controller 230 requests a Web page including the address information corresponding to the user-selected content (S330).

The WAP server 10 then provides the Web page (or an http page) including the address information (i.e., a Uniform Resource Identifier (URI) of the selected content) to the mobile communication terminal 200 (S340). In addition, the URI includes Uniform Resource Locator (URL) information of the user-selected content.

Further, the controller 230 checks the remaining capacity of the memory 240 and the capacity of the user-selected content to be downloaded (S350) and determines whether or not to download the user-selected content in a progressive mode (S360). Further, when the controller 230 determines the available memory capacity is insufficient to store the user-selected content (No in S360), the controller 230 displays a pop-up window on the display 260 to inform the user the selected content can not be downloaded using the progressive mode (S380).

Note, that the controller 230 may also refer to a table stored in the memory 240 that includes information about a minimum amount of memory capacity (e.g., 2 mega bytes) that must be available to download a user-selected content (e.g., it is preferably there be at least a particular amount of memory available after the user-selected content is downloaded). That is, it is preferable not to download a user-selected content that will leave only a small amount of memory left such that the small amount of memory left is insufficient to perform other tasks on the terminal. The user may also set this minimum amount of memory capacity via menu options provided on the terminal 200.

When the controller 230 determines there is enough memory available to download the user-selected content (Yes in S360), the controller 230 downloads the user-selected content using the progressive mode (S370).

Figure 4:
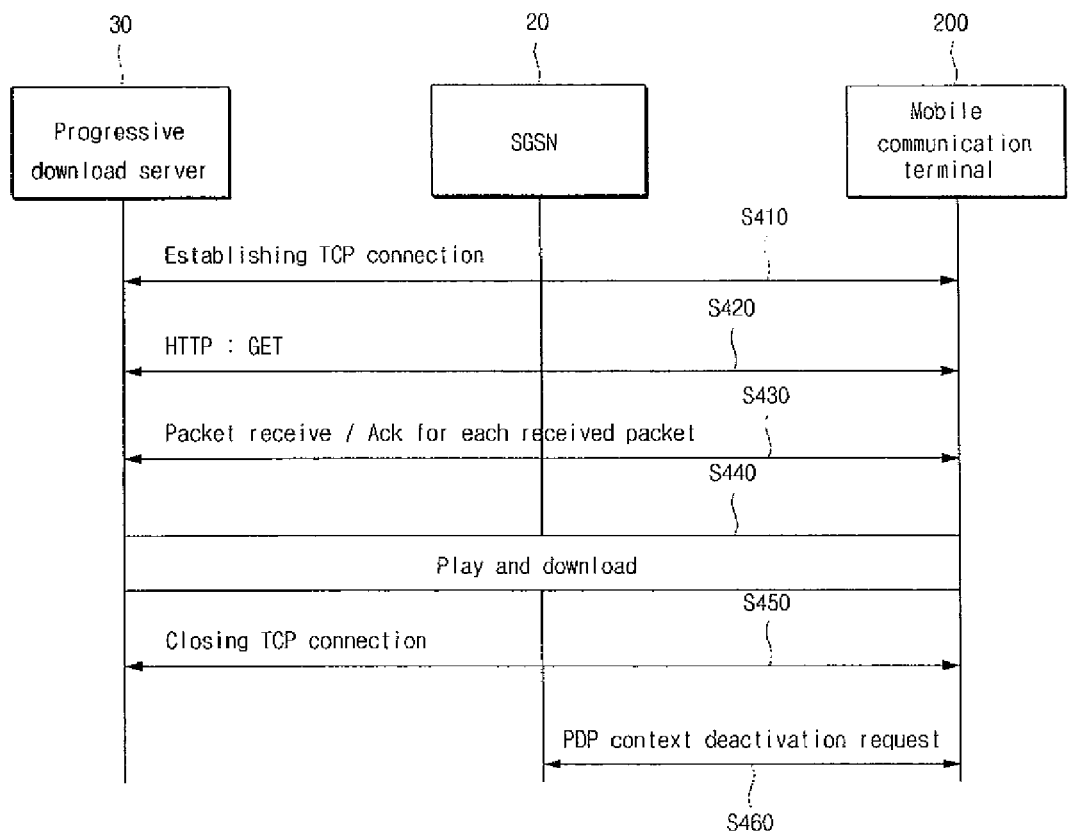
FIG. 4 is a message flow diagram illustrating in more detail step S370 of FIG. 3.

Next, FIG. 4 is a message flow diagram illustrating in more detail step S370 of FIG. 3. Referring to FIG. 4, the controller 230 controls the wireless transceiver 210 to establish a Transmission Control Protocol (TCP) connection to the progressive download server 30 (S410).

The controller 230 then requests the corresponding content on the progressive download server 30 be downloaded using the URL information of the content included in the URI and thus receives the corresponding content from the progressive download server 30 (S420). The terminal 200 then receives a TCP packet from the progressive download server 30 and transmits a response packet for the received TCP Packet to the progressive download server 30 (S430). Accordingly, control and traffic related sessions are established between the mobile terminal 200 and the progressive download server 30.

Next, the mobile terminal 200 receives a content packet from the progressive download server 30, temporarily stores the content packet to the buffer 250, and plays the content packet on the display 260. This process is repeated while the terminal 200 receives packets from the progressive download server 30 (S440). When all the packets are received from the progressive download server 30, the mobile terminal 200 closes the TCP connection to the progressive download server 30 (S450). The mobile terminal 200 then requests a PDP context deactivation to the SGSN 20 and thus the SGSN 20 deactivates the PDP context (S460). Accordingly, the path for receiving data from the progressive download server 30 is closed.

Figure 5:
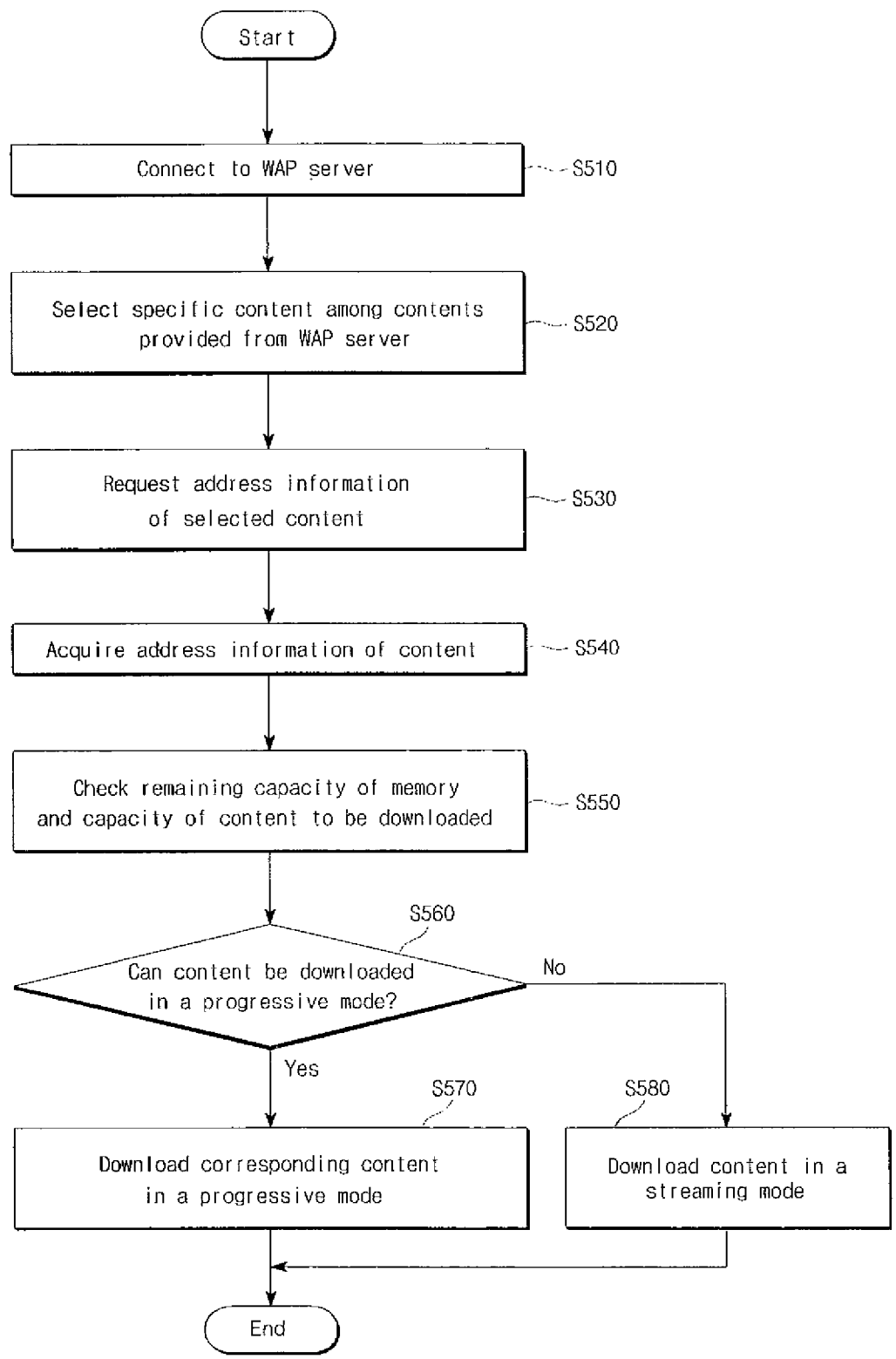
FIG. 5 is a flowchart illustrating a method of selectively providing a multimedia service to a mobile communication terminal according to another embodiment of the present invention.

FIG. 5 is a flowchart illustrating a method of providing a multimedia service of a mobile communication terminal in another embodiment of the present invention. Note that steps S510 to S570 in FIG. 5 are similar to the steps S310 to S370 of FIG. 3, and therefore a detailed description of these steps will be omitted.

The main difference between FIGS. 3 and 5 is shown in step S580. That is, when the controller 230 determines the content can not be downloaded in the progressive mode (because there is not enough memory capacity) (No in S560), the controller 230 automatically converts the download mode of the content from the progressive mode to the streaming mode and downloads the content in the streaming mode (S580).

Figure 6:
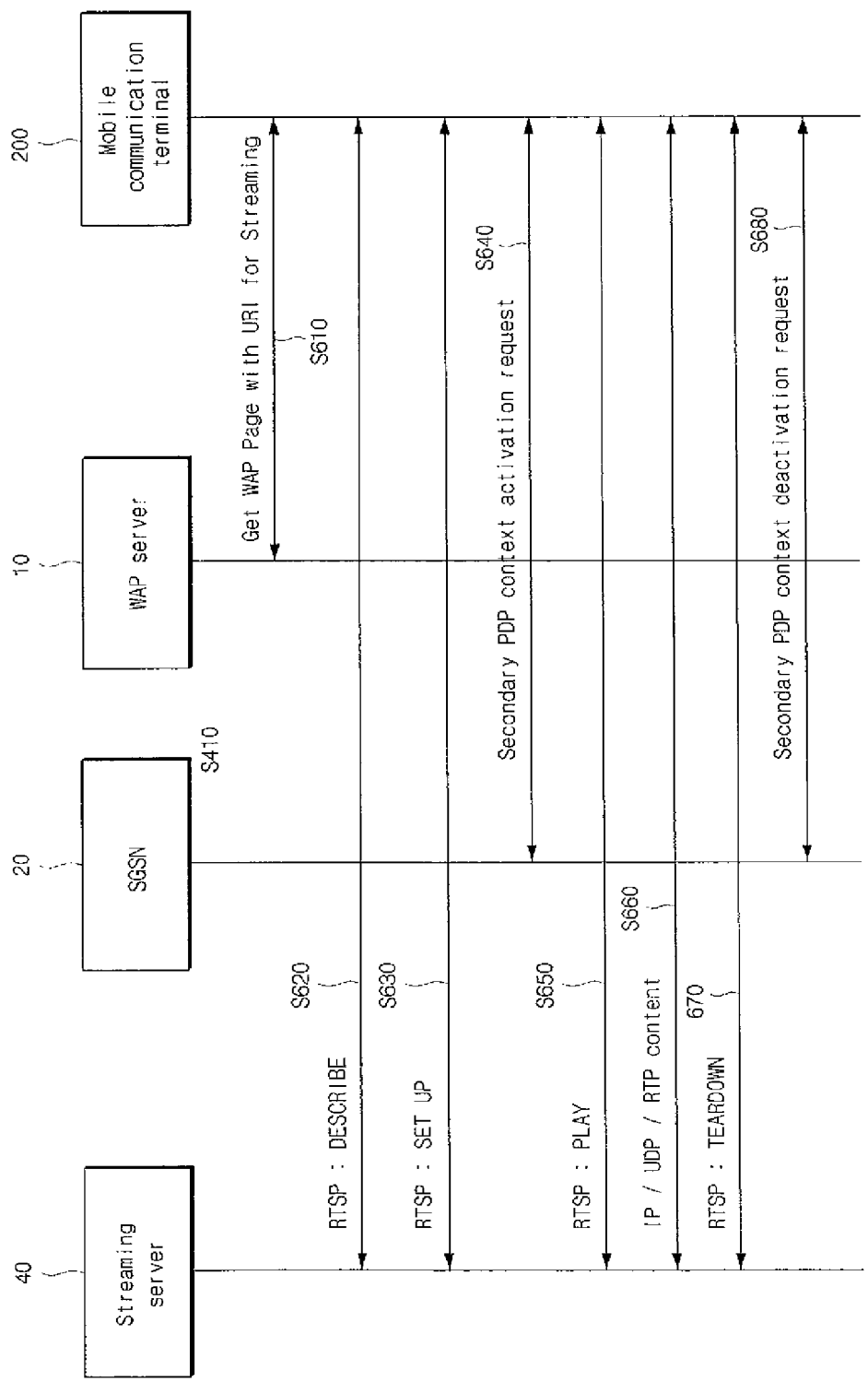
FIG. 6 is a message flow diagram illustrating in more detail step S580 of FIG. 5.

In more detail, FIG. 6 is a message flow diagram illustrating the step S580 of FIG. 5. As shown in FIG. 6, the controller 230 requests the URI information of the streaming server 40 for providing the corresponding content through the wireless transceiver 210 from the WAP server 10 and receives the URI information of the streaming server 40 from the WAP server 10 (S610).

Further, the mobile terminal 200 separately transmits a parameter indicating that the progressive download is impossible to the WAP server 10 due to the limited capacity of the memory. In addition, the URI information received from the WAP server 10 includes address information of the corresponding content stored within the streaming server 40.

The mobile terminal 200 then connects to the corresponding streaming server 40 using the URI information, requests a description file of the content selected by the user, and receives the description file for the user-selected content from the streaming server 40 (S620). Further, the description file includes information such as a content name, a date, an author, a content type, or a content size.

The mobile terminal 200 then sets the session to the streaming server 40 using a Real Time Streaming Protocol (RTSP) (S630). The RTSP is a protocol of application layer that transmits media in real time.

When the session is set to the streaming server 40, the terminal 200 requests a secondary PDP context activation to the SGSN 20 according to the 3GPP TS 23.060 standard and thus the SGSN 20 activates the PDP context (S640). Accordingly, a path for receiving data from the streaming server 40 is established.

The mobile terminal 200 then requests the play of the content by transmitting a streaming data transmission request message to the streaming server 40. The streaming server 40 transmits a response message for the streaming data transmission request message to the mobile communication terminal 200 (S650).

Further, the streaming server 40 in which the play of the content is requested transmits streaming data corresponding to the content using the IP/UDP/RDP protocol to the terminal 200, and the terminal 200 plays the received streaming data, whereby the user can view the requested content in real time (S660).

Also, when all of the data has been sent to the terminal 200 and the multimedia streaming service ends, the mobile terminal 200 transmits a session or service end message (RTSP: TEAR DOWN) to the streaming server 40. The streaming server 40 then transmits a response message for the session or service end message to the terminal 200 (S670). Finally, the terminal 200 requests the PDP context deactivation to the SGSN 20 and thus the SGSN 20 deactivates the PDP context (S680).

In this way, when it is difficult to download the content in the progressive mode due to the limited capacity of the memory, the mobile terminal 200 advantageously downloads the content using the streaming mode.

FIG. 7 is a flowchart illustrating a method of providing a multimedia service of a mobile communication terminal in still another embodiment of the present invention. Note that steps S710 to S740 in FIG. 7 are similar to the steps S310 to S340 in FIG. 3, and therefore a detailed description of these steps will be omitted.

The difference between FIGS. 3 and 7 begins with step S750 in FIG. 7. That is, in step S750, the controller 230 checks a setting value indicating a download mode of the mobile communication terminal 200. As mentioned above, the user may advantageously set the setting value to indicate a download mode he or she prefers. Further, in one example, the setting value is divided into 'streaming only available' for downloading a content using only the streaming mode and 'streaming/progressive both available' for downloading a content using either of the streaming or progressive download modes.

Therefore, as shown in FIG. 7, when the setting value is set to the 'streaming only available' (Yes in S760), the controller 230 downloads the corresponding content using the streaming mode without considering the state of the memory 240 (S770). In this instance, the user can view the downloaded content by the process shown in FIG. 6.

In addition, when the setting value is not set to the 'streaming only available (No in S760), the controller 230 determines if the setting value is set to 'streaming/progressive both available' (S780). When the setting value is set to 'streaming/progressive both available' (Yes in S780), the step S550 of FIG. 5 is performed (i.e., the memory capacity is checked and then a determination is made about whether to download the content in the streaming or progressive mode). In addition, it is also possible to skip step S780 and assume that when the setting value is not 'streaming only' the setting value is set as the 'streaming/progressive both available'. Also, rather than setting the setting value to 'streaming only', the user can also set the value to "progressive only' in which the terminal 200 performs the process beginning at step S350 in FIG. 3.

The above-description refers to the mobile terminal 200 connecting to the WAP server 10 to select a content to be download, but the present invention is also applicable to the situation in which the user selects a specific content included in a multimedia message transmitted via a Multimedia Message Service Center (MMSC) from another mobile communication terminal.

Further, when the terminal 200 is downloading a content using the progressive mode, and the controller 230 determines the memory capacity is insufficient (e.g., due to another process running on the terminal), the mobile terminal 200 advantageously changes the download mode to the streaming mode. Also, when enough memory capacity becomes available while the download of the content is performing using the streaming mode, the download mode may be automatically converted to the progressive download mode.

Further, when a service state of a network is not sufficient when downloading contents using the streaming or progressive mode, the terminal may advantageously switch to a simpler download mode. In addition, when the download mode is converted to the progressive download mode as the memory space is secured while the download is performed using the streaming download mode, the content may be downloaded to the memory at the specific point when the memory space is secured. Thus, when the content is again downloaded, only the portion not stored in the memory can be downloaded and stored in the memory.

As described above, the present invention advantageously downloads content using the streaming mode when there is not enough memory space available. Further, the content can be downloaded using a particular downloading mode that is selected by the user.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of providing a multimedia service to a mobile communication terminal, the method comprising:
    selecting a content to be downloaded;
    determining if a remaining memory capacity of the mobile terminal is less than a capacity of the content to be downloaded; and
    downloading the content using a streaming mode when the determining step determines the remaining memory capacity is less than the capacity of the content to be downloaded and using a progressive mode when the determining step determines the remaining memory capacity is greater than the capacity of the content to be downloaded.

2. The method of claim 1, further comprising:
    notifying a user of the mobile terminal that the remaining memory capacity is less than the capacity of the content to be downloaded and that the content can not be downloaded using the progressive mode.

3. The method of claim 1, wherein the downloading step comprises:
    referring to a preset setting value indicating whether the content is to be downloaded using the streaming mode or using any one of the streaming mode or the progressive mode.

4. The method of claim 3, wherein when the preset setting value indicates the content is to be downloaded using the streaming mode, the downloading step downloads the contents using the streaming mode without consideration of the remaining memory capacity on the mobile terminal.

5. The method of claim 3, wherein when the preset setting value indicates the content is to be downloaded using any one of the streaming mode or the progressive mode, the downloading step downloads the contents using the progressive mode only if the determining step determines the remaining memory capacity of the mobile terminal is greater than the capacity of the content to be downloaded.

6. The method of claim 1, wherein downloading the content using the streaming mode comprises:
    receiving an address of a streaming server for providing the content;
    connecting to the streaming server; and
    downloading the content from the streaming server using the streaming mode.

7. The method of claim 1, wherein the progressive mode downloads the content and stores the content in a memory of the mobile terminal, and the streaming mode only downloads the content and does not store the content in the memory of the mobile terminal.

8. The method of claim 1, wherein the determining step determines the remaining memory capacity while the content is being downloaded using the progressive mode, and
    wherein the method further comprises changing the progressive download mode to the streaming mode when the determining step determines the remaining memory capacity is less than the capacity of the content to be downloaded.

9. The method of claim 1, wherein the determining step determines the remaining memory capacity while the content is being downloaded using the streaming mode, and
    wherein the method further comprises changing the streaming download mode to the progressive download mode when the determining step determines the remaining memory capacity is greater than the capacity of the content to be downloaded.

10. The method of claim 1, further comprising:
    determining a service state of a network while downloading the content using the streaming mode or the progressive mode; and
    changing a download mode to a simpler download mode when the service state of the network is not sufficient.

11. A mobile communication terminal, comprising:
    an input unit configured to select a content to be downloaded;
    a wireless transceiver configured to receive the content from a server;
    a memory configured to store the content; and
    a controller configured to download the content using a streaming mode when the remaining memory capacity is less than the capacity of the content to be downloaded and using a progressive mode when the remaining memory capacity is greater than the capacity of the content to be downloaded.

12. The mobile communication terminal of claim 11, further comprising:

a display for notifying a user of the mobile terminal that the remaining memory capacity is less than the capacity of the content to be downloaded and that the content can not be downloaded using the progressive mode.

13. The mobile communication terminal of claim 11, further comprising:

a preset setting value stored in the memory and for indicating whether the content is to be downloaded using the streaming mode or using any one of the streaming mode or the progressive mode.

14. The mobile communication terminal of claim 13, wherein when the preset setting value indicates the content is to be downloaded using the streaming mode, the controller downloads the contents using the streaming mode without consideration of the remaining memory capacity on the mobile terminal.

15. The mobile communication terminal of claim 13, wherein when the preset setting value indicates the content is to be downloaded using any one of the streaming mode or the progressive mode, the controller downloads the contents using the progressive mode only if the determining step determines the remaining memory capacity of the mobile terminal is greater than the capacity of the content to be downloaded.

16. The mobile communication terminal of claim 11, wherein controller downloads the content using the streaming mode by receiving an address of a streaming server for providing the content, connecting to the streaming server, and downloading the content from the streaming server using the streaming mode.

17. The mobile communication terminal of claim 11, wherein the progressive mode downloads the content and stores the content in a memory of the mobile terminal, and the streaming mode only downloads the content and does not store the content in the memory of the mobile terminal.

18. The mobile communication terminal of claim 11, wherein the controller is further configured to determine the remaining memory capacity while the content is being downloaded using the progressive mode, and to change the progressive download mode to the streaming mode when the remaining memory capacity is less than the capacity of the content to be downloaded.

19. The mobile communication terminal of claim 11, wherein the controller is further configured to determine the remaining memory capacity while the content is being downloaded using the streaming mode, and to change the streaming download mode to the progressive download mode when the remaining memory capacity is greater than the capacity of the content to be downloaded.

20. The mobile communication terminal of claim 11, wherein the controller is further configured to determine a service state of a network while downloading the content using the streaming mode or the progressive mode, and to change a download mode to a simpler download mode when the service state of the network is not sufficient.

* * * * *